(12) United States Patent
Huang et al.

(10) Patent No.: US 6,172,692 B1
(45) Date of Patent: Jan. 9, 2001

(54) MULTILEVEL INK MIXING DEVICE AND METHOD USING DILUTED AND SATURATED COLOR INKS FOR INKJET PRINTERS

(75) Inventors: Xuan-Chao Huang; Brant Dennis Nystrom, both of Lexington, KY (US)

(73) Assignee: Lexmark International, Inc., Lexington, KY (US)

( * ) Notice: Under 35 U.S.C. 154(b), the term of this patent shall be extended for 0 days.

(21) Appl. No.: 09/248,562

(22) Filed: Feb. 11, 1999

(51) Int. Cl.[7] ............................... B41J 2/21; B41J 2/145; B41J 2/15; G01D 11/00; G03F 3/08; H04N 1/46

(52) U.S. Cl. ............................. 347/43; 347/40; 347/100; 358/518; 358/525

(58) Field of Search ............................... 347/43, 40, 100, 347/15; 358/518, 52.5

(56) References Cited

U.S. PATENT DOCUMENTS

| | | |
|---|---|---|
| 4,412,225 | 10/1983 | Yoshida . |
| 4,635,078 | 1/1987 | Sakurada et al. . |
| 4,672,432 | 6/1987 | Sakurada et al. . |
| 4,682,186 | 7/1987 | Saito et al. . |
| 4,686,538 | 8/1987 | Kouzato . |
| 4,692,773 | 9/1987 | Saito et al. . |
| 4,695,846 | 9/1987 | Suzuki . |
| 4,714,964 | 12/1987 | Sasaki . |
| 4,860,026 | 8/1989 | Matsumoto . |
| 4,881,182 | 11/1989 | Hank et al. . |
| 4,930,018 | 5/1990 | Chan et al. . |
| 5,353,387 | 10/1994 | Petschik et al. . |
| 5,386,305 | 1/1995 | Usami . |
| 5,422,740 | 6/1995 | Fujimoto et al. . |
| 5,428,377 | 6/1995 | Stoffel et al. . |
| 5,473,446 | * 12/1995 | Perumal, Jr. et al. ............... 358/523 |
| 5,479,272 | 12/1995 | Saito . |
| 5,500,921 | 3/1996 | Ruetz . |
| 5,537,516 | 7/1996 | Sherman et al. . |
| 5,553,200 | 9/1996 | Accad . |
| 5,563,724 | 10/1996 | Boll et al. . |
| 5,625,397 | 4/1997 | Allred et al. . |

(List continued on next page.)

OTHER PUBLICATIONS

William H. Press, et al., Numerical Recipes In C, The Art of Scientific Computing, 2nd Edition, Cambridge University press, 1992, pp. 113–128.

*Primary Examiner*—Thinh Nguyen
(74) *Attorney, Agent, or Firm*—George N. Stevens; D. Brent Lambert (57) ABSTRACT

A device and method of printing a color image using a lookup table that indicates the amount of at least two concentrations of a given ink color to use. Initially, several color wedges made from uniformly distributed digital counts for each color from lightest to darkest are printed. The color lightness value for each wedge is then measured as an L* value of the CIELAB system along with a granularity value. An interpolation process is then performed to determine the color lightness values and granularity values for color values between wedges. A diluted ink minimum color lightness point is identified by determining the darkest color that can be generated using only diluted ink. Ink patterns are then selected using only diluted ink for color lightness values lighter than the diluted ink minimum lightness point in the lookup table. A zero diluted ink starting point is then identified by determining that granularity improvement cannot be achieved significantly when adding more diluted ink to a pixel matrix. Ink patterns are then selected using a mixture of diluted and saturated ink that gives a print image within a predetermined percentage of a target color lightness value and within a predetermined percentage of the granularity of the pixel matrix using an optimum amount of diluted ink. Finally, ink patterns are selected using only saturated ink for color lightness values darker than the zero diluted ink starting point in the look up table.

30 Claims, 9 Drawing Sheets

U.S. PATENT DOCUMENTS

| | | |
|---|---|---|
| 5,625,755 * | 4/1997 | Shu .................................. 358/1.9 |
| 5,649,072 | 7/1997 | Balasubramanhian . |
| 5,696,845 | 12/1997 | Loce et al. . |
| 5,729,360 | 3/1998 | Kita et al. . |
| 5,734,802 | 3/1998 | Maltz et al. . |
| 5,742,306 | 4/1998 | Gompertz et al. . |
| 5,751,326 | 5/1998 | Bernasconi . |
| 5,764,252 | 6/1998 | Burr et al. . |
| 5,798,776 | 8/1998 | Uchiyama et al. . |
| 5,799,136 | 8/1998 | Li et al. . |

* cited by examiner

| R | G | B | $C_0$ | $M_0$ | Y | K |
|---|---|---|---|---|---|---|
| 0 | 0 | 0 | .. | .. | .. | .. |
| 0 | 0 | 16 | .. | .. | .. | .. |
| .. | .. | .. | .. | .. | .. | .. |
| 0 | 0 | 255 | .. | .. | .. | .. |
| 0 | 16 | 0 | .. | .. | .. | .. |
| 0 | 16 | 16 | .. | .. | .. | .. |
| .. | .. | .. | .. | .. | .. | .. |
| 0 | 255 | 0 | .. | .. | .. | .. |
| 0 | 255 | 16 | .. | .. | .. | .. |
| .. | .. | .. | .. | .. | .. | .. |
| 0 | 255 | 255 | .. | .. | .. | .. |
| 16 | 0 | 0 | .. | .. | .. | .. |
| 16 | 0 | 16 | .. | .. | .. | .. |
| .. | .. | .. | .. | .. | .. | .. |
| 255 | 0 | 0 | .. | .. | .. | .. |
| 255 | 0 | 16 | .. | .. | .. | .. |
| .. | .. | .. | .. | .. | .. | .. |
| 255 | 0 | 255 | .. | .. | .. | .. |
| 255 | 16 | 0 | .. | .. | .. | .. |
| 255 | 16 | 16 | .. | .. | .. | .. |
| .. | .. | .. | .. | .. | .. | .. |
| 255 | 255 | 255 | 0 | 0 | 0 | 0 |

FIG. 3

| INDEX (x) | $C_d$ | $C_s$ | $M_d$ | $M_s$ |
|---|---|---|---|---|
| 0 | 0 | 0 | 0 | 0 |
| 1 | 1 | 0 | 1 | 0 |
| .. | .. | .. | .. | .. |
| 150 | 121 | 70 | 209 | 18 |
| 151 | 118 | 72 | 206 | 20 |
| .. | .. | .. | .. | .. |
| 254 | 0 | 252 | 0 | 251 |
| 255 | 0 | 255 | 0 | 255 |

MULTILEVEL INK MIXING DEVICE AND METHOD USING DILUTED AND SATURATED COLOR INKS FOR INKJET PRINTERS

BACKGROUND OF THE INVENTION

1. Field of the Invention

The present invention relates to a device and method for determining usage of diluted versus saturated color inks in an inkjet printer. More particularly, the present invention relates to a device and method for determining the amount of diluted and saturated inks used for each color throughout the color range of a color inkjet printer.

2. Description of the Related Art

In recent years color inkjet printers have been developed for home and office use. These printers have typically used four different inks in the colors of cyan, magenta, yellow and black (hereinafter "CMYK") color inks. These color inks were of a single high concentration and were useful in generating reports, charts and graphs. However, due to the granularity of these saturated inks, it was not possible to create near photographic quality images.

To overcome this granularity problem in the saturated inks, diluted inks have been employed. These diluted inks are used to reproduce the less intense colors of the CIELAB system while the more intense colors require the usage of the saturated inks. Typically only diluted forms of the cyan and magenta are used in these printers and a total of six different inks comprising cyan, magenta, yellow, black, diluted cyan and diluted magenta (hereinafter "CMYKcm") are thus used.

The CIELAB system mentioned above is a color space to be used for the specification of color differences. It consists of three variables (L*, a*, and b*) as Cartesian coordinates to form a three-dimensional color space. The L* variable indicates perceived color lightness ranging from 0.0 for black to 100.0 for a diffuse white. The a* and b* dimensions correspond to the red-green and yellow-blue chroma perceptions, respectively. The a* and b* values can take on both negative and positive values. Their maximum values are limited by the physical properties of materials involved, including the inks themselves and the print medium used. When mixing the diluted and saturated inks, the L* dimension value of the CIELAB system is found more significant in determining graininess and color perception. If the L* has a smooth transition in perceived color and lightness in the mixing process, the other two dimensions (a* and b*) will also be perceived to be reasonably smooth.

In the printing method the printer or printer driver receives a red, green, and blue (hereinafter "RGB") digital color image and it is necessary to then convert this image to the appropriate CMYKcm values. To convert the RGB image to printed CMYKcm images; a three to six dimensional lookup table (not shown) is often used. This method gives more flexibility for color reproductions but slows the printing process since more online computations (interpolations) are necessary to determine all points in the color space. Therefore, the printing process takes considerably longer.

Further, the method of determining when and how much diluted ink to use versus saturated ink has been a subjective process. A technician would view wedges for each color using either the diluted or saturated ink or a mixture of the two and determine which the technician believed produced the best results for each color intensity.

Figure 1:
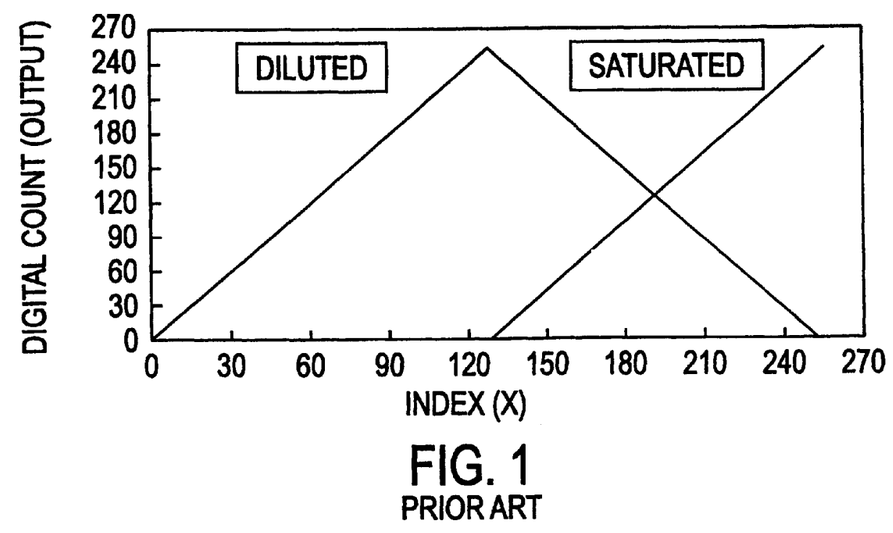
FIG. 1 is a chart illustrating the mixing of diluted and saturated inks to produce the entire color range for a given color ink as practiced in the prior art.

Several problems are encountered using this subjective approach. First, the results vary according to the technician. Second, at some point the technician will have to switch from use of the diluted ink to the saturated inks. At this point, if the change is not done gradually, a sudden change in granularity and color lightness (L* value) will be detectable by the user. FIG. 1 shows an example of non-smoothed mixing of the diluted and saturated inks in the prior art. In this example, the diluted ink digital count first increases linearly from 0 to 255 (maximum) and then linearly decreases from 255 to 0. The saturated ink digital count is zero before the diluted ink reaches the maximum (255) and then linearly increases from 0 to 255 as shown in FIG. 1. This approach will generate a non-smoothed color lightness, L* value profile, as shown in FIG. 2.

Figure 2:
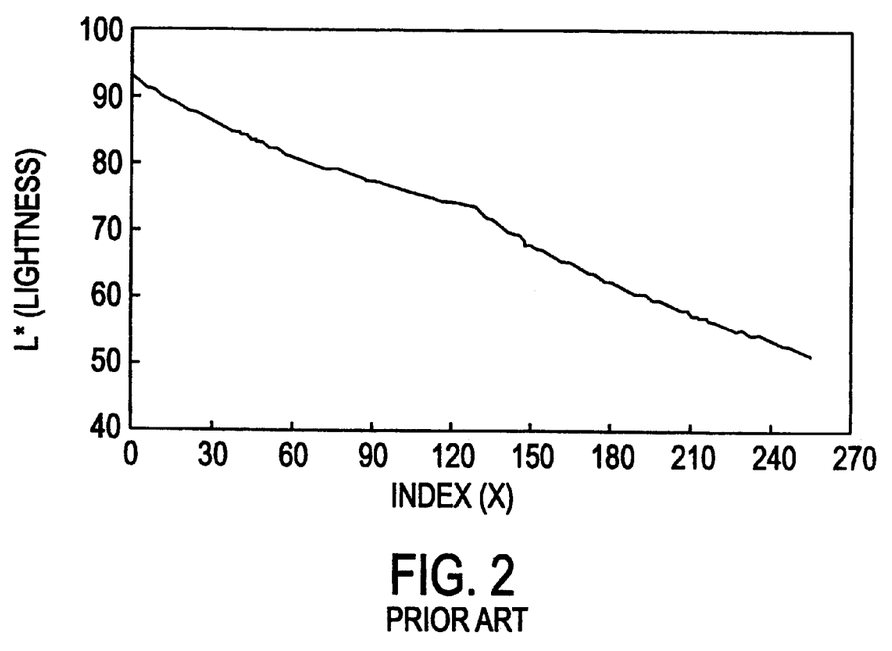
FIG. 2 is a chart illustrating the L* value of the CIELAB system resulting from the mixing of diluted and saturated inks as shown in FIG. 1 in the prior art.

As can be seen in FIG. 2, there is an abrupt change in color lightness value, L* value, when the saturated ink is introduced in the mixture. Further, the user sees a similar and even more dramatic perceptible abrupt difference in image granularity. This results in significant variations in a single given image in transitions from lighter to darker colors and prevents the achievement of near photographic image quality.

In order to overcome these problems a device and method is needed that systematically determines which ink concentrations to use for each color value. Further, the resolution of the image should be kept as high as possible by minimizing image graininess (granularity). Also, the processing required by the printer or the printer driver in determining which inks to use at the time of printing should be kept at an absolute minimum so that printing may proceed at the fastest possible rate. Finally, the device and method should provide for a smooth transition in granularity and color lightness from lighter to darker colors.

SUMMARY OF THE INVENTION

An object according to embodiments of the present invention is accomplished by a device and method to resolve the above mentioned problems by meeting two major criteria to achieve the goal of near photographic image quality. First, minimize image graininess and provide maximum image resolution. Second, maximize color smoothness by providing a smooth transition from diluted ink usage to saturated ink usage.

Objects and advantages of the present invention are achieved in accordance with embodiments by a method of generating a color image with a color inkjet printer using a diluted ink of a color and a saturated ink of that color. This method begins by determining a diluted ink minimum lightness point representing a darkest color that can be created in a pixel matrix by the diluted ink in the color inkjet printer. This method then mixes the saturated ink into the pixel matrix starting at a nominal digital count point below or equal to the diluted ink minimum lightness point and decreases the diluted ink used in the pixel matrix while maintaining a granularity value of the pixel matrix to be printed to within a predetermined percentage of a granularity value of the color when using a maximum amount of diluted ink to generate the pixel matrix.

In accordance with embodiments of the present invention, the method of generating a color image with a color inkjet printer is accomplished by the predetermined percentage of the granularity value of the color being set equal to or less than 5% of the maximum amount of diluted ink to generate the pixel matrix.

In accordance with further embodiments of the present invention, the method of generating a color image with a color inkjet printer also includes mixing the saturated ink into the pixel matrix starting at the nominal digital count point and decreasing the diluted ink used in the pixel matrix while maintaining the color lightness value of a color to be printed to within a predetermined percentage of a target color lightness profile.

In accordance with still further embodiments of the present invention, the method of generating a color image with a color inkjet printer is accomplished by the predetermined percentage of color lightness value of the pixel matrix is equal to or less than 3% of the target color lightness profile.

In accordance with still further embodiments of the present invention, the method of generating a color image with a color inkjet printer is accomplished in that only diluted ink is used to create pixel matrices below the nominal digital count point.

In accordance with further embodiments of the present invention, the method of generating a color image with a color inkjet printer also includes storing in a DILUT and SILUT lookup table numerous digital counts forming a curve representing amounts of ink to use in the pixel matrix in a full range of possible color lightness values from lightest to darkest based on using only diluted ink below the nominal digital count point and the mixing of diluted and saturated ink above the nominal digital count point and below a zero diluted ink starting point. This zero diluted ink starting point represents a point at which the granularity of the image will not improve by adding more diluted ink to the pixel matrix.

In accordance with further embodiments of the present invention, the method of generating a color image with a color inkjet printer also includes adding to the DILUT and SILUT lookup table numerous digital counts forming a curve representing amounts of ink to be used in printing the pixel matrix for color lightness values above the zero diluted ink starting point using only the saturated ink to print the pixel matrix.

In accordance with further embodiments of the present invention, the method of generating a color image with a color inkjet printer also includes smoothing the curve of digital counts representing amounts of ink to use in the pixel matrix. This curve is then stored into the DILUT and SILUT lookup table.

In accordance with further embodiments of the present invention, the method of generating a color image with a color inkjet printer also includes receiving an image to be printed and printing the image based on the amounts of ink stored in the DILUT and SLUT lookup table.

Further objects and advantages of present invention are achieved in accordance with embodiments by a device to generate a color image with a color inkjet printer using a diluted ink of a given color and a saturated ink of the given color to be printed by the color inkjet printer. This device includes a diluted ink usage module to determine a diluted ink minimum lightness point representing the darkest color that can be created in a pixel matrix by the diluted ink in the color inkjet printer. It also includes a combination ink usage module to determine the amount of the saturated ink to mix into the pixel matrix starting at a nominal digital count point equal to or below the diluted ink minimum lightness point. This combination ink usage module then decreases the diluted ink used in the pixel matrix while maintaining a granularity value of a pixel matrix to be printed to less than or equal to a predetermined percentage of a granularity value obtained when using a maximum amount of the diluted ink to generate the pixel matrix.

In accordance with further embodiments of the present invention, the combination ink usage module mixes the saturated ink into the pixel matrix starting at the nominal digital count point and decreasing the diluted ink used in the pixel matrix while maintaining the color lightness value of the pixel matrix to be printed is equal or less than a predetermined percentage of a target color lightness profile.

In accordance with further embodiments of the present invention, the device to generate a color image with a color inkjet printer uses only diluted ink to create pixel matrices whose color lightness values are lighter than the lightness value of the nominal digital count point.

In accordance with further embodiments of the present invention, the device to generate a color image with a color inkjet printer also includes a table generation curve smoothing module to store in a DILUT and SILUT lookup table numerous digital counts forming a curve representing amounts of the saturated and diluted ink to be used in the printing of the pixel matrix in a full range of possible color lightness values from lightest to darkest based on input from the diluted ink usage module and the combination ink usage module.

In accordance with further embodiments of the present invention, the device to generate a color image with a color inkjet printer also includes a saturated ink usage module to add to the DILUT and SILUT lookup table numerous digital counts forming a curve representing amounts of ink to use in the pixel matrix for color lightness values above a zero diluted ink starting point using only saturated ink. The zero diluted ink starting point represents a point at which the granularity of the image will not improve by adding more diluted ink to the pixel matrix.

In accordance with further embodiments of the present invention, the table generation curve smoothing module smooths the curve of digital counts representing amounts of ink to use in the pixel matrix and storing the smoothed curve in the DILUT and SILUT lookup table.

In accordance with further embodiments of the present invention, the device to generate a color image with a color inkjet printer receives an image to be printed, and prints the image based on the amounts of ink stored in the DILUT and SILUT lookup table.

Further objects and advantages of the present invention are achieved in accordance with embodiments by a method of printing an image using a color inkjet printer having a lookup table containing amounts of a diluted ink and amounts of a saturated ink to be used when reproducing colors of varying color lightness values. This method starts by identifying a diluted ink minimum lightness point by determining the darkest color that can be generated using only a maximum amount of the diluted ink. It then generates the lookup table including the amounts of the diluted ink using only the diluted ink for colors lighter than the diluted ink minimum lightness point. It identifies a zero diluted ink starting point by determining that granularity of the image will not improve by adding more diluted ink to a pixel matrix. The method then adds to the lookup table amounts of the saturated ink for colors darker than the zero diluted ink starting point. The method generates the look up table using a mixture of diluted and saturated ink for colors darker than the diluted ink minimum lightness point but lighter than the zero diluted ink starting point. Finally, the method adds to the lookup table amounts of the mixture of the diluted and the saturated ink that produces the pixel matrix within a predetermined percentage of a color lightness profile and within a predetermined percentage of a granularity of the pixel matrix created using an optimum amount of diluted ink for color lightness values darker than the diluted ink minimum lightness point but lighter than the zero diluted ink starting point in the look up table.

In accordance with further embodiments of the present invention, the method of printing an image using a color inkjet printer includes a lookup table that contains a DILUT curve representing amounts of diluted ink and a SILUT curve representing amounts of saturated ink.

Further objects and advantages of present invention are achieved in accordance with embodiments by a device to print an image using a color inkjet printer having a lookup table containing amounts of a diluted ink and amounts of saturated ink to be used when reproducing colors of varying color lightness values. The device includes a diluted ink usage module to identify a diluted ink minimum lightness point by determining the darkest color that can be generated in a pixel matrix using only a maximum amount of the diluted ink and to add to the lookup table amounts of the diluted ink using only the diluted ink for colors lighter than the diluted ink minimum lightness point. This device also includes a saturated ink usage module to identify a zero diluted ink starting point by determining that granularity of the pixel matrix will not improve by adding more diluted ink to a pixel matrix and to add to the lookup table amounts of the saturated ink for colors darker than the zero diluted ink starting point. Finally, a combination ink usage module is used to add to the lookup table a plurality of amounts of a mixture of the diluted ink and the saturated ink that produces the image within a predetermined percentage of a target color lightness profile and within a predetermined percentage of a granularity of the print image created using an optimum amount of diluted ink for color lightness values darker than the diluted ink minimum lightness point but lighter than the zero diluted ink starting point in the lookup table.

Still further objects of the present invention are achieved by a device that is used to generate a lookup table. This lookup table includes numerous concentrations of a given ink color used in creating a print image in an inkjet printer. The device of the present invention uses a L* measurement unit to measure a color lightness of several color wedges printed in uniformly distributed digital counts for each color from lightest to darkest. A bicubic spline interpolation module is used to interpolate the color lightness values and granularity values for color values between the color wedges. An L* linearizing module forms a linear L* target using the L* value of the paper white point as the maximum and that of the 100% saturated ink as a minimum. A diluted ink usage module identifies a diluted ink minimum color lightness point by determining the darkest color that can be generated using only diluted ink and storing in the lookup table a large number of diluted ink amounts from a paper white point to a pixel matrix representing the diluted ink minimum color lightness point. A saturated ink usage module identifies a zero diluted ink starting point by determining that granularity improvement cannot be achieved significantly when adding more diluted ink to the pixel matrix and storing in the lookup table only saturated ink amounts for color lightness values darker than the zero diluted ink starting point. A combination ink usage module determines a mixture of an amount of the diluted ink and an amount of the saturated ink that gives a print image within a predetermined percentage of each color lightness value and within a predetermined percentage of the granularity of the image created using an optimum amount of diluted ink for each color lightness value darker than the diluted ink minimum lightness point but lighter than the zero diluted ink starting point in the look up table.

BRIEF DESCRIPTION OF THE DRAWINGS

These and other objects and advantages of the invention will become apparent and more readily appreciated for the following description of the preferred embodiments, taken in conjunction with accompanying drawings.

DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

According to a preferred embodiment of the present invention, in order to maximize printing speed while keeping the same near photographic quality, a multilevel ink mixing method is employed. This method mixes the two different levels (diluted and saturated) for each color of ink desired into two one-dimensional lookup tables forming a total of four one-dimensional tables (diluted cyan, saturated cyan, diluted magenta, and saturated magenta). This mixing occurs not by actually physically mixing the two different levels of ink, but by the placement of individual pixels or dots of each ink level in close proximity to each other on the print medium in a pixel matrix. A pixel matrix may be composed of any number of individual pixels or dots of the various colors and levels (CMYKcm) of ink and is based on the color range desired. Due to the small size and the close proximity of the dots, the pixel matrix would be viewed as having a particular L*, a* and b* value in the CIELAB system.

Figure 3:
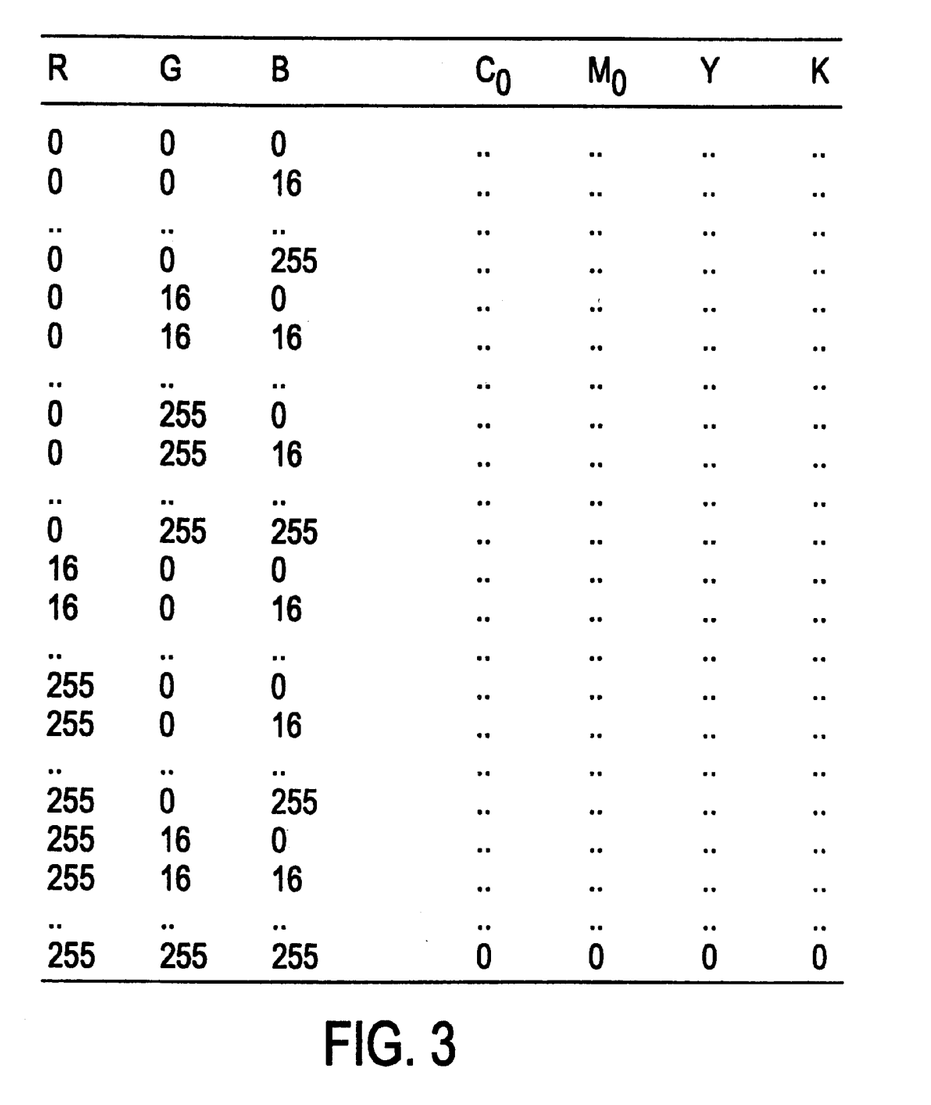
FIG. 3 is a three variable to four variable three-dimensional lookup table in which colors are converted from RGB values to CMYK values in a first step toward printing according to a preferred embodiment of the present invention.
Figure 4:
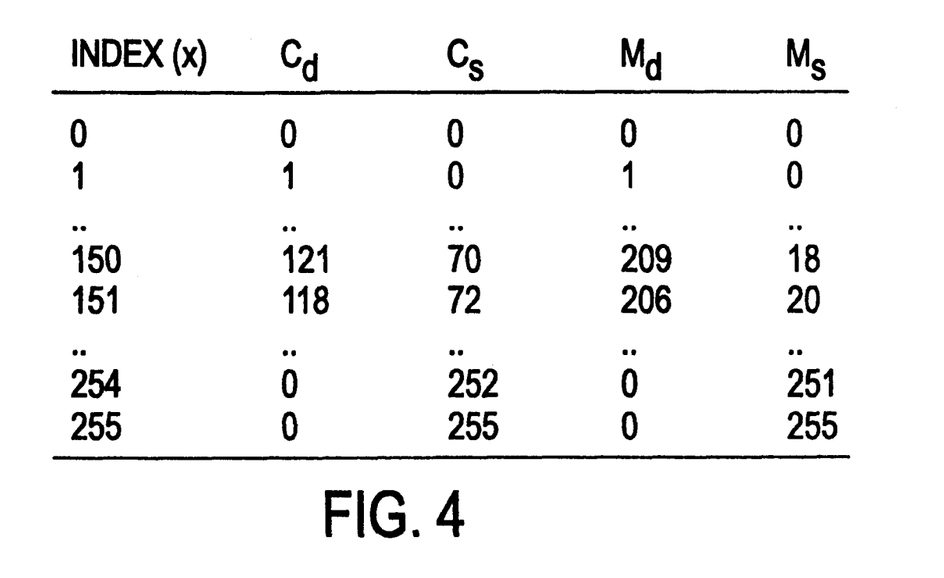
FIG. 4 is a four variable one-dimensional lookup table to convert the Cyan and Magenta values found in the table illustrated in FIG. 3 to a mixture of diluted cyan, saturated cyan, diluted magenta, and saturated magenta inks according to a preferred embodiment of the present invention.

Using this method it is possible to treat the two inks (diluted and saturated) as if they were simply one ink and treat CMYKcm printing as if is simply CMYK printing from the three-dimensional lookup table perspective. Using this method a three variable to four variable three-dimensional lookup table can be used. One example of the format of such a three variable to four variable three-dimensional lookup table is shown in FIG. 3. An example of a one-dimensional lookup table is shown in FIG. 4. The left three columns (variables) of the three-dimensional portion of the table in FIG. 3 are designated R, G, B values and the right four columns (variables) are designated Co, Mo, Y, K. When a printer or a printer driver receives R, G, and B values from an image, it will lookup (or interpolate) the corresponding Co, Mo, Y, K values. The driver or printer will then further look up the diluted and saturated ink amounts from the four one-dimensional lookup tables created according to a preferred embodiment of the present invention using $C_0$ as an index to the two (saturated and dilute) cyan lookup tables and $M_0$ as an index to the two magenta lookup tables. Since looking up the one-dimensional table takes much less time than doing the three-dimensional interpolation, this method is faster than using a three variable to six variable three-dimensional table of the prior art. Described below is how the diluted and saturated levels of an ink are mixed as two variable one-dimensional lookup tables.

Figure 5:
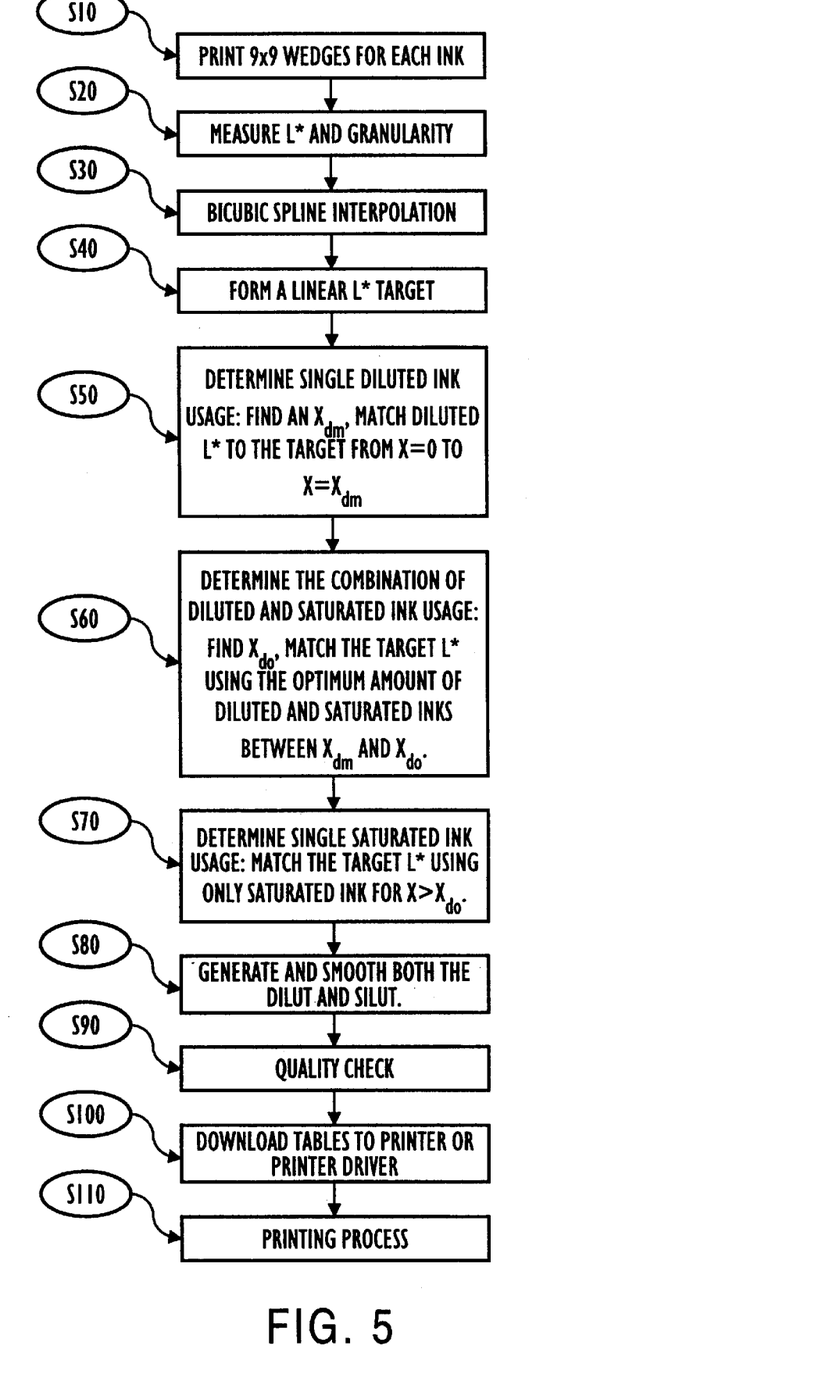
FIG. 5 is a flowchart of the method employed according to an embodiment of the present invention in creating the combination of diluted ink lookup table hereinafter "DILUT") and saturated ink lookup table (hereinafter "SILUT") shown in FIG. 4 according to a preferred embodiment of the present invention.

FIG. 5 is a flowchart of the method employed according to a preferred embodiment of the present invention in creating the combination of DILUT and SILUT table shown in FIG. 3 and FIG. 4. In this discussion, the following symbols are used:

| | |
|---|---|
| (1) $C_s$, $M_s$ | = digital count of saturated cyan, magenta; |
| (2) $C_d$, $M_d$ | = digital count of diluted cyan, magenta; |
| (3) x | = nominal digital count, index to the L* target profile, DILUT and SILUT; |
| (4) $x_{dm}$ | = nominal digital count at which the diluted ink reaches its maximum intensity value, called a "diluted ink minimum lightness point"; |
| (5) $x_{d0}$ | = nominal digital count at which the diluted ink reaches zero value, called a "zero diluted ink starting point", |
| (6) $DC_d$ | = digital count of diluted ink that is a function of the nominal digital count x, and |
| (7) $DC_s$ | = digital count of saturated ink that is a function of the nominal digital count x. |

Figure 6:
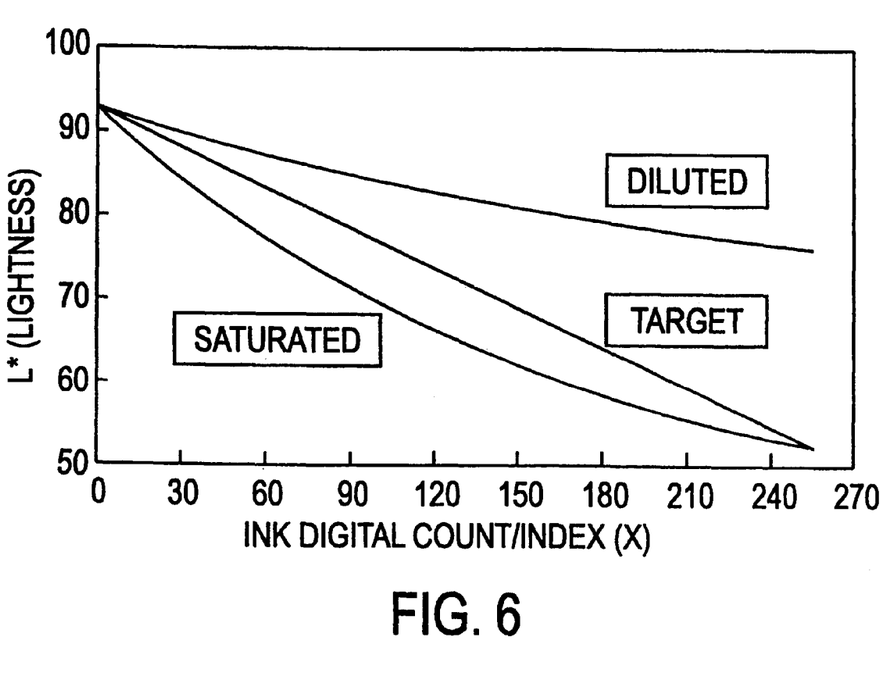
FIG. 6 is a chart used in the diluted and saturated ink mixing method shown in FIG. 5 including the measured L* versus diluted and saturated ink digital count and the target L* profile versus the nominal digital count index are illustrated.

The objective of multilevel ink printing is to achieve photographic quality by reducing the image graininess. Within a certain range (from light to dark image areas), the exclusive use or greater use of diluted ink creates an image with less graininess and greater resolution. In the ink mixing method according to a preferred embodiment of the present invention, the wedge lightness (L* value in the CIELAB system), granularity, and the saturated ink lightness profile are employed to determine the optimum diluted and saturated ink usage for any given color. Diluted ink lookup table (hereinafter "DILUT") and saturated ink lookup table (hereinafter "SILUT") are generated to specify how much diluted and saturated ink should be used at each digital level (0, 1, 2, ..., 255). If the lightness (L*) value is not linearized, the index (x) to the DILUT and SILUT is the saturated ink digital count and the contents of the tables are diluted and saturated ink digital counts (y). If no diluted ink is used, the contents of the DILUT will all be zero and the contents of SILUT will linearly increase from 0 to 255. If the lightness (L*) value is linearized, the index to the DILUT and SILUT equals the nominal ink digital count. Also, the contents of the tables associated with the nominal ink digital count represent the diluted and saturated ink digital counts that vary according to changes in the nominal ink digital count. With a nominal ink digital count from 0 to 255 the diluted and saturated ink combination will produce the color lightness (L*) value linearly changing from the maximum (lightest) to the minimum (darkest) as shown in FIG. 6. The method to determine the DILUT and SILUT is described below.

Experimental Wedges

As provided in step S10 of FIG. 5, a total of nine evenly spaced points are selected to cover the whole digital range of each ink color and are printed using a color inkjet printer (not shown). All the combinations of nine-point diluted and nine-point saturated inks are used to print 9×9 wedges or a total of 81 wedges. As is appreciated by a person of ordinary skill in the art, the number of wedges used depends on the accuracy desired and the amount of interpolation which can be tolerated.

Measurements

Figure 9:
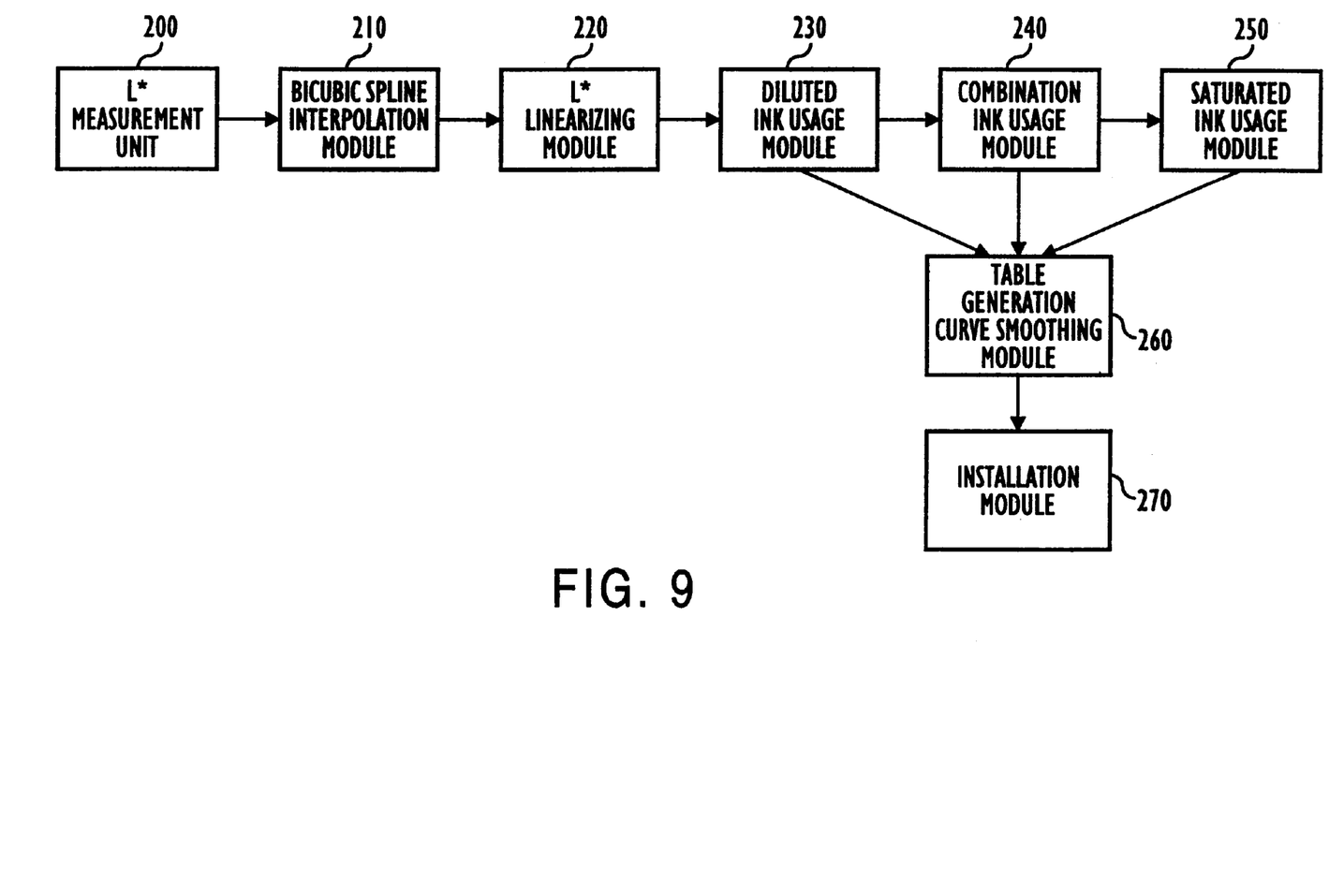
FIG. 9 is a block diagram showing the modular configuration of the flowchart as shown in FIG. 5 according to a preferred embodiment of the present invention.

As provided in step S20 of FIG. 5, the L* value of CIELAB system is measured for each wedge using a L* measurement unit 200 shown in FIG. 9 such as a spectrophotometer. The granularity is also measured for those wedges whose L* values are smaller (darker) than the darkest diluted wedge. According to a preferred embodiment of the present invention, a visual examination score for the granularity (0–100, with 100 being the most granularity) is given to each of the darker wedges. For other wedges whose measured granularity is not required, the neighboring measured granularity values are assigned to them for data interpolation convenience.

Bicubic Spline Interpolation

As provided in step S30 of FIG. 5, the L* values and the granularity values are interpolated to any digital point (total 255×255 points) by a bicubic spline interpolation scheme using a bicubic spline interpolation module 210 shown in FIG. 9. The scheme interpolates a color value and granularity value between four measured neighboring wedges based on the measured values and derivatives of the neighbors of each of the four measured points. This method is a common technique for smoothing in two-dimensional interpolation and is well documented in the literature (e.g., William H. Press, Saul A. Teukolsky, William T. Vetterling, Brian P. Flannery, 1992, *Numerical Recipes in C*, The Art Of Scientific Computing, $2^{nd}$ edition, Cambridge University Press, pp, 113–128).

Lookup Table Determination

The general rule for the ink mixing is that the diluted ink contributes to the light color pixel matrices and the saturated ink contributes to the dark color pixel matrices. Both the diluted and saturated inks may be used for middle-tone color pixel matrices.

Forming a Target L* Profile Value

As provided in step S40 of FIG. 5, an L* profile value needs to be selected as a target so that determination of the appropriate combination of the diluted and saturated digital count meet the target. In this target L* profile value (also referred to as a "target color lightness profile"), the maximum (lightest) L* value is determined from the paper white point and the minimum (darkest) L* value is determined from the 100% application of saturated ink as shown in FIG. 6 by a L* linearizing module 220 shown in FIG. 9. When the nominal digital count (x value in FIG. 6) varies from 0 to 255, the target L* value linearly changes from the maximum to the minimum value. The lookup table determination involves determining the diluted and saturated digital count for each x value, in FIG. 6, such that the diluted and saturated ink together will produce the corresponding L* value specified by the target L* profile value at the point x.

Determining the Single Diluted Ink Usage

As provided in step S50 of FIG. 5, only diluted ink is used for the points whose L* values is greater (lighter) than that of the darkest diluted wedge by a diluted ink usage module 230 shown in FIG. 9. For each nominal digital count x in FIG. 7, the corresponding diluted digital count, designated $DC_d$, which gives the same L* value as specified by the target L* profile value, is found until no such diluted $DC_d$ points are found. The last nominal digital count point determined is denoted as $x_{dm}$, and represents the target L* value equal to that of the darkest diluted wedge. For index values below the determined $x_{dm}$, no saturated ink is used. At the $x_{dm}$ point, the diluted ink reaches its maximum usage.

Determining the Combination of Diluted and Saturated Ink Usage

Figure 7:
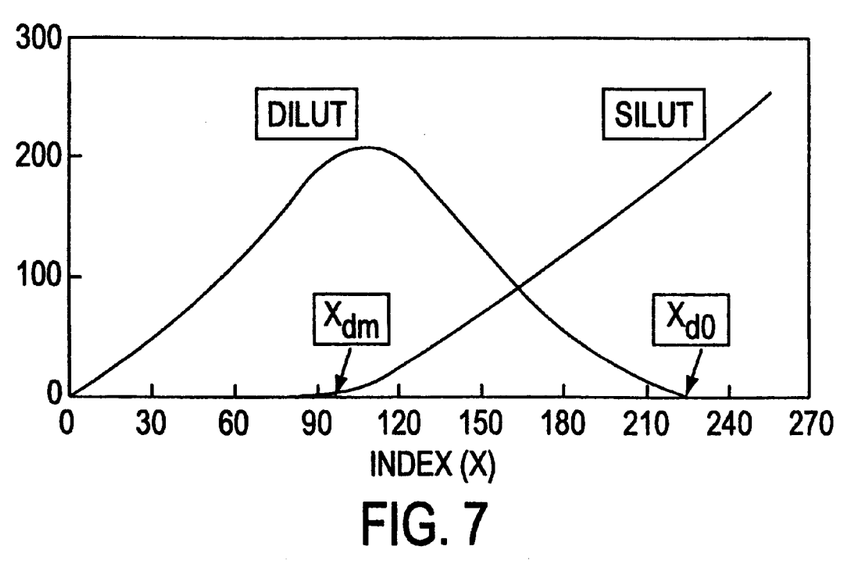
FIG. 7 is a chart showing the resulting SILUT and DILUT received in the diluted and saturated ink mixing method shown in FIG. 5 in which the digital count versus diluted and saturated ink digital count is illustrated in graphic form and stored in the table shown in FIG. 4 according to a preferred embodiment of the present invention.

As provided in step S60 of FIG. 5, for each point x greater than $x_{dm}$ point in FIG. 7, a combination of diluted and saturated ink satisfying the following conditions is determined by the combination ink usage module 240, shown in FIG. 9.

I. No more than a predetermined percentage tolerance deviation from the L* specified by the target L* value is permitted. A range of equal to or less than 3% has been determined to produce the best results for the predetermined tolerance deviation. Typically, many different combinations of diluted and saturated ink will meet this selection criteria.

II. No more than a predetermined percentage deviation in granularity reduction is permitted when the diluted ink increases from that seen when the maximum amount of diluted ink is used for any given L* value. A range of equal to or less than 5% has been determined to produce the best results for this predetermined percentage deviation in granularity. Employing the second condition in conjunction with the first will reduce the possible diluted and saturated ink combination to only one.

As x increases in FIG. 7, the diluted ink digital count will decrease to zero. This x value is designated as $X_{d0}$ at which the saturated ink alone will produce the L* value specified by the target. The point $x_{d0}$ is the zero diluted ink starting point.

Determining the Single Saturated Ink Usage

As provided in step S70 of FIG. 5, only saturated ink is used after the zero diluted ink starting point $X_{d0}$ is passed. For each point x greater than $X_{d0}$, a single saturated ink digital count $D_s$, that produces the L* value specified by the target is found by the saturated ink usage module 250 shown in FIG. 9.

Smoothing Both the Diluted and Saturated Ink Lookup Tables

As provided in step S80 of FIG. 5, the lookup table is created based on the input of the diluted ink usage module 230, the combination ink usage module 240 and the saturated ink usage module 250. However the SILUT and DILUT lookup table needs to be smoothed after its formation. Since the lookup table is determined based on the 9×9 measured wedges and the measured (or visually determined) granularity, noise from the measurements will propagate into the lookup table. Thus, a running-average scheme to smooth the lookup table is employed. A run-length of eleven points is found suitable for this purpose. That is, for each point in the lookup table, the original point is replaced with the average of the left most five points, the point itself, and the right most five points.

However, as would be appreciated by one of ordinary skill in the art any well known technique for statistical or mathematically smoothing a curve may be employed.

Quality Check

Figure 8:
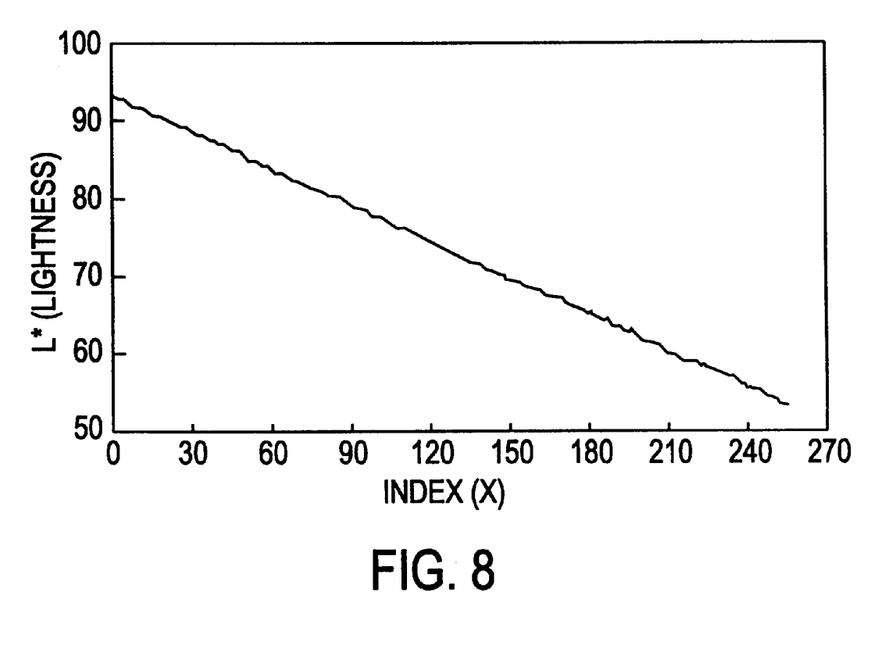
FIG. 8 is a chart illustrating the L* value of the CIELAB system resulting from the mixing of diluted and saturated inks as shown in FIG. 7 according to a preferred embodiment of the present invention.

As provided in step S90 of FIG. 5, as a quality control procedure, the composite ink lightness profile is measured to check whether it meets the target. In addition, a continuous color strip of the composite inks should be printed out for visual examination. As shown in FIG. 8, the measured L* profile using the DILUT & SILUT shown in FIG. 7 is in agreement with the target shown in FIG. 6.

Download Tables

Once the quality control procedure of step S90 of FIG. 5 is completed, the DILUT and SILUT values may be incorporated in a printer driver (not shown), in step S100 of FIG. 5. This printer driver may be located either in a computer (not shown) connected to a color inkjet printer (not shown) or directly in the color inkjet printer. This incorporation process provided by step S100 in FIG. 5 is accomplished by the installation module 270 shown in FIG. 9.

As would be appreciated by one of ordinary skill in the art, the foregoing tables may be physically located in volatile or nonvolatile memory or in a mass storage device such as a disk drive located either on a computer or in the color inkjet printer. Also, the foregoing tables may be included in EPROM or ROM provided in the color inkjet printer.

Printing Process

Once the installation process is completed in step S100 of FIG. 5 by installation module 270 shown in FIG. 9, the DILUT and SILUT values may be used to print color images. The printer driver located in the computer or the printer would receive RGB values for pixel matrices in a color image to be printed. The three to four variable three-dimensional lookup table shown in FIG. 3 would be used to convert the RGB values to CMYK values. The initial cyan and magenta values, designated $C_0$ and $M_0$, retrieved are then used as an index to the four variable one-dimensional lookup table shown in FIG. 4. Once the amounts of saturated and diluted ink are extracted from the table of FIG. 4, the printing of an image may proceed.

Using the DILUT and SILUT tables generated by the device and method of the present invention, near photographic images may be generated in which granularity is kept to a minimum and there is a smooth and undetectable transition between the usage of diluted and saturated inks.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A method of generating a color image with a color inkjet printer using a diluted ink of a color and a saturated ink of the color, comprising:

determining a diluted ink minimum lightness point representing a darkest color that can be created in a pixel matrix by the diluted ink in the color inkjet printer; and mixing the saturated ink into the pixel matrix starting at a nominal digital count point below or equal to the diluted ink minimum lightness point and decreasing the diluted ink used in the pixel matrix while maintaining a granularity value of the pixel matrix to be printed to within a predetermined percentage of a granularity value of the color when using a maximum amount of diluted ink to generate the pixel matrix.

2. A method of generating a color image with a color inkjet printer as recited in claim 1, wherein the predetermined percentage of the granularity value of the color is equal to or less than 5% of the maximum amount of diluted ink to generate the pixel matrix.

3. A method of generating a color image with a color inkjet printer as recited in claim 1, further comprising:
mixing the saturated ink into the pixel matrix starting at the nominal digital count point and decreasing the diluted ink used in the pixel matrix while maintaining the color lightness value of a color to be printed to within a predetermined percentage of a target color lightness profile.

4. A method of generating a color image with a color inkjet printer as recited in claim 3, wherein the predetermined percentage of color lightness value of the pixel matrix is equal to or less than 3% of the target color lightness profile.

5. A method of generating a color image with a color inkjet printer as recited in claim 3, wherein only diluted ink is used to create pixel matrices below the nominal digital count point.

6. A method of generating a color image with a color inkjet printer as recited in claim 5, further comprising:
storing in a DILUT and SILUT lookup table a plurality of digital counts forming a curve representing amounts of ink to use in the pixel matrix in a full range of possible color lightness values from lightest to darkest based on using only diluted ink below the nominal digital count point and the mixing of diluted and saturated ink above the nominal digital count point and below a zero diluted ink starting point representing a point at which the granularity of the image will not improve by adding more diluted ink to the pixel matrix.

7. A method of generating a color image with a color inkjet printer as recited in claim 6, further comprising:
adding to the DILUT and SILUT lookup table a plurality of digital counts forming a curve representing amounts of ink to be used in printing the pixel matrix for color lightness values darker than the zero diluted ink starting point using only the saturated ink to print the pixel matrix.

8. A method of generating a color image with a color inkjet printer as recited in claim 7, further comprising:
smoothing the curve of the plurality of digital counts representing amounts of ink to use in the pixel matrix and storing the smoothed curve into the DILUT and SILUT lookup table.

9. A method of generating a color image with a color inkjet printer as recited in claim 8, further comprising:
receiving an image to be printed; and
printing the image based on the amounts of ink stored in the DILUT and SILUT lookup table.

10. A device to generate a color image with a color inkjet printer using a diluted ink of a given color and a saturated ink of the given color to be printed by the color inkjet printer, comprising:
diluted ink usage module to determine a diluted ink minimum lightness point representing the darkest color that can be created in a pixel matrix by the diluted ink in the color inkjet printer; and
combination ink usage module to determine the amount of the saturated ink to mix into the pixel matrix starting at a nominal digital count point equal to or below the diluted ink minimum lightness point and decreasing the diluted ink used in the pixel matrix while maintaining a granularity value of a pixel matrix to be printed to less than or equal to a predetermined percentage of a granularity value obtained when using a maximum amount of the diluted ink to generate the pixel matrix.

11. A device to generate a color image with a color inkjet printer as recited in claim 10, wherein the predetermined percentage of the granularity value of the pixel matrix is equal to or less than 5% of the granularity value obtained using the maximum amount of diluted ink to generate the pixel matrix.

12. A device to generate a color image with a color inkjet printer as recited in claim 10, wherein:
the combination ink usage module mixes the saturated ink into the pixel matrix starting at the nominal digital count point and decreasing the diluted ink used in the pixel matrix while maintaining the color lightness value of the pixel matrix to be printed is equal or less than a predetermined percentage of a target color lightness profile.

13. A device to generate a color image with a color inkjet printer as recited in claim 12, wherein the predetermined percentage of color lightness value of the pixel matrix is equal to or less than 3% of the target color lightness profile.

14. A device to generate a color image with a color inkjet printer as recited in claim 12, wherein only the diluted ink is used to create pixel matrices whose color lightness values are lighter than the lightness value of the nominal digital count point.

15. A device to generate a color image with a color inkjet printer as recited in claim 14, further comprising:
table generation curve smoothing module to store in a DILUT and SILUT lookup table a plurality of digital counts forming a curve representing amounts of the saturated and diluted ink to be used in the printing of the pixel matrix in a full range of possible color lightness values from lightest to darkest based on input from the diluted ink usage module and the combination ink usage module.

16. A device to generate a color image with a color inkjet printer as recited in claim 15, further comprising:
saturated ink usage module to add to the DILUT and SILUT lookup table a plurality of digital counts forming a curve representing amounts of ink to use in the pixel matrix for color lightness values darker than a zero diluted ink starting point using only saturated ink, wherein the zero diluted ink starting point represents a point at which the granularity of the image will not improve by adding more diluted ink to the pixel matrix.

17. A device to generate a color image with a color inkjet printer as recited in claim 16, wherein:
the table generation curve smoothing module smooths the curve of digital counts representing amounts of ink to use in the pixel matrix and storing the smoothed curve in the DILUT and SLUT lookup table.

18. A device to generate a color image with a color inkjet printer as recited in claim 17, wherein
the color inkjet printer receives an image to be printed, and prints the image based on the amounts of ink stored in the DILUT and SILUT lookup table.

19. A method of printing an image using a color inkjet printer having a lookup table containing a plurality of amounts of a diluted ink and a plurality of amounts of a saturated ink to be used when reproducing a plurality of colors of varying color lightness values, comprising:

identifying a diluted ink minimum lightness point by determining the darkest color that can be generated using only a maximum amount of the diluted ink;

generating the lookup table including the plurality of amounts of the diluted ink using only the diluted ink for colors lighter than the diluted ink minimum lightness point;

identifying a zero diluted ink starting point by determining that granularity of the image will not improve by adding more diluted ink to a pixel matrix;

adding to the lookup table a plurality of amounts of the saturated ink for colors darker than the zero diluted ink starting point;

generating the look up table using a mixture of diluted and saturated ink for colors darker than the diluted ink minimum lightness point but lighter than the zero diluted ink starting point; and     adding to the lookup table a plurality of amounts of the mixture of the diluted and the saturated ink that produces the pixel matrix within a predetermined percentage of a color lightness profile and within a predetermined percentage of a granularity of the pixel matrix created using an optimum amount of diluted ink for color lightness values darker than the diluted ink minimum lightness point but lighter than the zero diluted ink starting point in the look up table.

20. A method of printing an image using a color inkjet printer having a lookup table as recited in claim 19, wherein the lookup table comprises a DILUT curve representing amounts of diluted ink and a SILUT curve representing amounts of saturated ink.

21. A method of printing an image using a color inkjet printer having a lookup table as recited in claim 20, further comprising:

smoothing the DILUT curve and SILUT curve.

22. A method of printing an image using a color inkjet printer having a lookup table as recited in claim 21, further comprising:

printing the pixel matrix using the lookup table.

23. A device to print an image using a color inkjet printer having a lookup table containing a plurality of amounts of a diluted ink and a plurality of amounts of saturated ink to be used when reproducing a plurality of colors of varying color lightness values, comprising:

diluted ink usage module to identify a diluted ink minimum lightness point by determining the darkest color that can be generated in a pixel matrix using only a maximum amount of the diluted ink and to add to the lookup table a plurality of amounts of the diluted ink using only the diluted ink for colors lighter than the diluted ink minimum lightness point;

saturated ink usage module to identify a zero diluted ink starting point by to determining that granularity of the pixel matrix will not improve by adding more diluted ink to a pixel matrix and to add to the lookup table a plurality of amounts of the saturated ink for colors darker than the zero diluted ink starting point; and     combination ink usage module to add to the lookup table a plurality of amounts of a mixture of the diluted ink and the saturated ink that produces the image within a predetermined percentage of a target color lightness profile and within a predetermined percentage of a granularity of the print image created using an optimum amount of diluted ink for color lightness values darker than the diluted ink minimum lightness point but lighter than the zero diluted ink starting point in the lookup table.

24. A device to print an image using a color inkjet printer having a lookup table as recited in claim 23, wherein the lookup table comprises a DILUT curve representing amounts of diluted ink and a SILUT curve representing amounts of saturated ink.

25. A device to print an image using a color inkjet printer having a lookup table as recited in claim 24, further comprising:

table generation curve smoothing module to smooth the DILUT curve and SILUT curve and store the smoothed DILUT and SILUT curves in the lookup table.

26. A device to print an image using a color inkjet printer having a lookup table as recited in claim 25, wherein     the color inkjet printer prints using the lookup table.

27. A method of creating a lookup table having a plurality of amounts of a plurality of concentrations of a given ink color to use in creating a print image, comprising:

generating a plurality of color wedges made from uniformly distributed digital counts for each color from lightest to darkest using varying amounts of a diluted ink, a saturated ink and a mixture of diluted and saturated ink;

measuring a color lightness value for each wedge using a spectrophotometer;

determining a granularity value for each wedge by visual inspection;

interpolating a plurality of color lightness values and a plurality of granularity values for color values between wedges;

forming a linear L* target profile using an L* value of a paper white point as a maximum and that of a 100% saturated ink as the minimum;

generating the lookup table using a plurality of amounts of only the diluted ink for colors lighter than the darkest color wedge created using only the diluted ink;

identifying a diluted ink minimum lightness point by determining the darkest color that can be generated using only diluted ink;

identifying a zero diluted ink starting point by determining that granularity improvement cannot be achieved significantly when adding more diluted ink;

storing ink amounts in the lookup table using only the saturated ink for color lightness values darker than the zero diluted ink starting point in the look up table; and     storing ink amounts in the lookup table using a mixture of the diluted ink and the saturated ink that gives the print image within a predetermined percentage of each color lightness value and within a predetermined percentage of the granularity of the print image created using an optimum amount of diluted ink for each color lightness value darker than the diluted ink minimum lightness point but lighter than the zero diluted ink starting point.

28. A method of creating a lookup table that indicates which of a plurality of concentrations of a given ink color to use in creating a print image as recited in claim 27, further comprising:

downloading the look up table to a printer driver; and printing a near photographic quality image using the color inkjet printer based on the lookup table.

29. A device to generate a lookup table having a plurality of concentrations of a given ink color to use in creating a print image in an inkjet printer, comprising:

L* measurement unit to measure an color lightness of a plurality of color wedges made from uniformly distributed digital counts for each color from lightest to darkest;

bicubic spline interpolation module to interpolate the color lightness values and granularity values for color values between the color wedges;

L* linearizing module to form a linear L* target using an L* value of a paper white point as the maximum and that of a 100% amount of a saturated ink as the minimum;

diluted ink usage module to identify a diluted ink minimum color lightness point by determining the darkest color that can be generated using only diluted ink and storing in the lookup table a plurality of diluted ink amounts from the paper white point to a pixel matrix representing the diluted ink minimum color lightness point;

saturated ink usage module to identify a zero diluted ink starting point by determining that granularity improvement cannot be achieved significantly when adding more diluted ink to the pixel matrix and storing in the lookup table only saturated ink amounts for color lightness values darker than the zero diluted ink starting point; and combination ink usage module to determine a mixture of an amount of the diluted ink and an amount of the saturated ink that gives a print image within a predetermined percentage of each color lightness value and within a predetermined percentage of the granularity of the image created using an optimum amount of diluted ink for each color lightness value darker than the diluted ink minimum lightness point but lighter than the zero diluted ink starting point in the look up table.

30. A device to generate a lookup table having a plurality of concentrations of a given ink color to use in creating a print image in an inkjet printer as recited in claim 29, further comprising:

installation module to download the look up table to a printer driver; and color inkjet printer to print a near photographic quality image using the lookup table.

* * * * *

UNITED STATES PATENT AND TRADEMARK OFFICE
CERTIFICATE OF CORRECTION

PATENT NO : 6,172,692
DATED : January 9, 2001
INVENTOR(S) : Xuan-Chao Huang, et al.

It is certified that error appears in the above-identified patent and that said Letters Patent are hereby corrected as shown below:

Col. 3, line 49
  replace "SLUT"
  with --SILUT--.
Col. 12, line 62
  replace "SLUT"
  with --SILUT--.
Col. 13, line 60
  replace "by to determining"
  with --by determining--.

Signed and Sealed this

Twenty-ninth Day of May, 2001

NICHOLAS P. GODICI

Attest:

Attesting Officer

Acting Director of the United States Patent and Trademark Office